United States Patent
Gaknoki et al.

(10) Patent No.: US 8,564,980 B2
(45) Date of Patent: *Oct. 22, 2013

(54) METHOD AND APPARATUS TO CONTROL A POWER CONVERTER HAVING A LOW LOOP BANDWIDTH

(71) Applicant: Power Integrations, Inc., San Jose, CA (US)

(72) Inventors: Yury Gaknoki, San Jose, CA (US); Mingming Mao, Saratoga, CA (US); David Michael Hugh Matthews, Los Gatos, CA (US); Tiziano Pastore, Los Gatos, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/633,773

(22) Filed: Oct. 2, 2012

(65) Prior Publication Data

US 2013/0027991 A1 Jan. 31, 2013

Related U.S. Application Data

(63) Continuation of application No. 13/315,166, filed on Dec. 8, 2011, now Pat. No. 8,300,434, which is a continuation of application No. 12/703,108, filed on Feb. 9, 2010, now Pat. No. 8,098,503.

(51) Int. Cl.
  *H02M 3/335* (2006.01)
(52) U.S. Cl.
  USPC .......................................... 363/21.17; 363/97
(58) Field of Classification Search
  USPC ........... 323/207; 363/21.01, 21.12, 21.17, 89, 363/97
  See application file for complete search history.

(56) References Cited

U.S. PATENT DOCUMENTS

| | | | |
|---|---|---|---|
| 4,468,725 | A | 8/1984 | Venturini |
| 5,047,912 | A | 9/1991 | Pelly |
| 5,134,355 | A | 7/1992 | Hastings |
| 5,461,303 | A | 10/1995 | Leman et al. |
| 5,742,151 | A | 4/1998 | Hwang |

(Continued)

FOREIGN PATENT DOCUMENTS

CN 1466808 A 1/2004

OTHER PUBLICATIONS

U.S. Appl. No. 12/210,854, filed Sep. 15, 2008, Odell.

(Continued)

*Primary Examiner* — Jeffrey Sterrett
(74) *Attorney, Agent, or Firm* — Blakely Sokoloff Taylor & Zafman LLP

(57) ABSTRACT

An example controller includes a comparator coupled to receive a feedback signal representative of an output of the power converter. A counter is coupled to receive an output of the comparator and a feedback sampling signal. The counter is coupled to sample the output of the comparator in response to the feedback sampling signal. A state machine is coupled to receive a feedback time period signal. The state machine is coupled to control switching of the power converter according to one of a plurality of operating conditions in response to the counter and the feedback time period signal. A period of the feedback time period signal is substantially greater than a period of the feedback sampling signal. The state machine is coupled to be updated in response to the feedback time period signal.

19 Claims, 6 Drawing Sheets

(56) References Cited

U.S. PATENT DOCUMENTS

| | | | |
|---|---|---|---|
| 5,804,950 | A | 9/1998 | Hwang et al. |
| 6,043,633 | A | 3/2000 | Lev et al. |
| 6,175,218 | B1 | 1/2001 | Choi et al. |
| 6,191,565 | B1 | 2/2001 | Lee et al. |
| 6,226,190 | B1 | 5/2001 | Balakrishnan et al. |
| 6,259,614 | B1 | 7/2001 | Ribarich et al. |
| 6,304,473 | B1 | 10/2001 | Telefus et al. |
| 6,320,434 | B1 | 11/2001 | Chang et al. |
| 6,421,256 | B1 | 7/2002 | Giannopoulos et al. |
| 6,504,315 | B2 | 1/2003 | Kim |
| 6,531,854 | B2 | 3/2003 | Hwang |
| 6,577,077 | B2 | 6/2003 | Hu et al. |
| 6,690,142 | B2 | 2/2004 | Hendrix |
| 6,700,764 | B2 | 3/2004 | Tan |
| 6,882,552 | B2 | 4/2005 | Telefus et al. |
| 6,900,623 | B2 | 5/2005 | Yang et al. |
| 7,098,605 | B2 | 8/2006 | Oh |
| 7,116,090 | B1 | 10/2006 | Yang et al. |
| 7,180,273 | B2 | 2/2007 | Bocchiola et al. |
| 7,196,917 | B2 | 3/2007 | O'Loughlin |
| 7,205,749 | B2 | 4/2007 | Hagen et al. |
| 7,250,742 | B2 | 7/2007 | Li |
| 7,262,559 | B2 | 8/2007 | Tripathi et al. |
| 7,317,625 | B2 | 1/2008 | Zhang et al. |
| 7,355,373 | B2 | 4/2008 | Melai et al. |
| 7,358,706 | B2 | 4/2008 | Lys |
| 7,375,994 | B2 | 5/2008 | Andreycak |
| 7,378,805 | B2 | 5/2008 | Oh et al. |
| 7,471,531 | B2 | 12/2008 | Blaha et al. |
| 7,501,800 | B2 | 3/2009 | Kim et al. |
| 7,511,437 | B2 | 3/2009 | Lys et al. |
| 7,514,913 | B2 | 4/2009 | Zhang et al. |
| 7,538,525 | B2 | 5/2009 | Kim et al. |
| 7,554,271 | B2 | 6/2009 | Thiery et al. |
| 7,626,372 | B2 | 12/2009 | Yang |
| 7,923,973 | B2 | 4/2011 | Odell |
| 8,098,503 | B2 * | 1/2012 | Gaknoki et al. ............ 363/21.17 |
| 8,300,434 | B2 * | 10/2012 | Gaknoki et al. ............ 363/21.17 |
| 2008/0246446 | A1 | 10/2008 | Djenguerian et al. |

OTHER PUBLICATIONS

"ICs for Consumer Electronics—Controller for Switch Mode Power Supplies Supporting Low Power Standby and Power Factor Correction," Infineon Technologies, TDA 16846/TDA 16847, Data Sheet Jul. 5, 1999 (27 pages).

"L6561—Power Factor Corrector," STMicroelectronics, Revision 16, Jun. 2004 (13 pages).

"CM6800—Low Start-Up Current PFC/PWM Controller Combo," Champion Microelectronic Corporation, Revision 1.9, Oct. 11, 2006 (18 pages).

"iW2202—Digital SMPS Controller: Preliminary Data," iWatt, Revision 1.1, (undated) (14 pages). (Download link via Google search: http://www.dianyuan.com/bbs/u/19/1091107799.pdf).

"iW3620—Digital PWM Constant Current Controller for AC/DC LED Driver," iWatt, Revision 0.2 Preliminary, Dec. 19, 2008 (5 pages). (Download link via Google: http://www.dianyuan.com/blog/u/2009-05/186166_1243233674.pdf).

"LED Driver Design with iW3620," iWATT, 24V/870mA LED Driver, Dec. 30, 2008 (17 pages). (Download link via Google search: http://125.39.71.4/down-dianyuan-bbs/78/1861661244628305.pdf).

"LED Driver Design with iW3620_18V350mA," iWatt, 18V/350mA LED Driver, Mar. 18, 2009 (12 pages). (Download link via Google search: http://www.dianyuan.com/bbs/u/77/1861661241952113.pdf).

"LED Driver Design with iW3620", iWATT, 28V/500mA LED Driver, Jun. 17, 2009 (15 pages). (Download link via Google search: http://www.dianyuan.com/bbs/u/79/1805081248845154.pdf).

"LED Driver Design with iW3620," iWATT, 40V/350mA LED Driver, Jun. 17, 2009 (15 pages). (Download link via Google search: http://www.dianyuan.com/bbs/u/81/1805081252300477.ppt).

"iW3620 Product Brief—Digital PWM Constant Current Controller for AC/DC LED Driver," iWatt, Revision 1.0, Oct. 1, 2009 (4 pages). (Download link via Google: http://www.dianyuan.com/blog/u/2009-05/186166_1243233674.pdf).

"L6563S—Enhanced transition-mode PFC controller," STMicroelectronics, DOC ID 16116 Revision 3, Jan. 2010 (42 pages).

"iW3610—ACDC Digital Power Controller for Dimmable LED: Advanced Datasheet," iWatt, Revision 0.5 and 0.3, (undated) (21 pages). (Download location: http://www.ysc-ic.com/system/Upload-Drivers/2010913164457504.pdf).

CN 201110034627.5—Chinese Office Action, issued Mar. 11, 2013, with English Translation (16 pages).

* cited by examiner

METHOD AND APPARATUS TO CONTROL A POWER CONVERTER HAVING A LOW LOOP BANDWIDTH

REFERENCE TO PRIOR APPLICATION(S)

This is a continuation of U.S. application Ser. No. 13/315,166, filed Dec. 8, 2011, which is a continuation of U.S. application Ser. No. 12/703,108, filed Feb. 9, 2010, now issued as U.S. Pat. No. 8,098,503. U.S. application Ser. No. 12/703,108 and U.S. Pat. No. 8,098,503 are hereby incorporated by reference.

BACKGROUND

1. Field of the Disclosure

The present invention relates generally to power supplies, and more specifically, the invention relates to power supplies that have a slow loop bandwidth.

2. Background

Power supplies are typically used to convert alternating current ("ac") power provided by an electrical outlet into direct current ("dc") to supply an electrical device or load. One important consideration for power supply design is the shape and phase of the input current drawn from the ac power source relative to the ac input voltage waveform. The voltage waveform of mains ac sources is nominally a sinusoid. However, due to the non-linear loading that many switching power supplies present to the ac source, the wave shape of the current drawn from the ac source by the power supply is non-sinusoidal and/or out of phase with the ac source voltage waveform. This leads to increased losses in the ac mains distribution system and, in many parts of the world, is now the subject of legislative or voluntary requirements that power supply manufacturers ensure the current drawn by the power supply is sinusoidal and in phase with the ac voltage waveform.

The correction of the input current waveform in this way is referred to as power factor correction (PFC). If the input ac current and voltage waveforms are sinusoidal and perfectly in phase, the power factor of the power supply is 1. In other words, a power factor corrected input will present a load to the ac source that is equivalent to coupling a variable resistance across the ac source. The effective resistance presented as a load to the ac source by the PFC corrected power supply is varied as a function of the rms voltage of the ac source in accordance with the power drawn by the PFC correct power supply output load. As harmonic distortion and/or phase displacement of the input current relative to the ac source voltage increase, the power factor decreases below 1. Power factor requirements typically require power factors greater than 0.9 and may have requirements for the harmonic content of the input current waveform.

Applications where switching power supplies must provide PFC include Light Emitting Diode (LED) lighting applications, which are becoming more popular due to the improved energy efficiency provided by LEDs compared to more traditional incandescent lamps. Since the brightness of light provided by LEDs is a function of the current flowing through them, the power supply also regulates the dc current provided to the LEDs, which form the output load to the power supply. The power supply control therefore combines the functions of dc output current regulation and also provides PFC by presenting a substantially resistive load to the mains ac source connected to the input of the power supply.

Output current regulation is typically achieved by sensing the current flowing in the LEDs and providing a feedback signal that is a function of the LED current to a power supply controller that regulates the flow of energy from an input to an output of the power supply. Switching power supplies will typically respond very quickly to fluctuations in current feedback information in order to regulate the LED current to be a smooth dc level.

As noted above, however, in order to achieve PFC, the power supply must present a load that is essentially resistive to the ac mains. Rapid changes in energy flow to regulate fast changes in LED current would corrupt the PFC performance and yield non-sinusoidal power supply input current waveforms and low power factor. Therefore, in order to achieve PFC, the power supply must be configured to respond slowly to fluctuations in current feedback information, which is often referred to as a slow power supply control loop or a low bandwidth loop. This slow loop functionality is normally achieved by introducing a large capacitance within the power supply control loop. The capacitance may for example be introduced at the output of the power supply to maintain a very stable dc output voltage at the output of the power supply that will tend to reduce any current fluctuations in the LED load.

In another example, the current in the LED is allowed to fluctuate but a large filter, typically comprising a large capacitance and resistance, is introduced in the feedback path between the LED current path and the power supply controller. This then filters the feedback signal such that the power supply controller is responding to a heavily filtered version of the power supply output current, which helps to prevent the controller making sudden demands for more or less energy flow from the ac mains input source.

Both of the above-described techniques to achieve PFC have the disadvantage of requiring physically large components in the power supply to slow the power supply control loop response. Typical applications for LED lights require that the power supply circuitry be as compact as possible as they often have to fit inside very small light bulb enclosures, sometimes referred to as in-bulb applications. Furthermore, large capacitors are a reliability and cost concern in such in-bulb LED lighting applications since temperatures inside the bulb are high requiring the use of expensive high temperature capacitors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
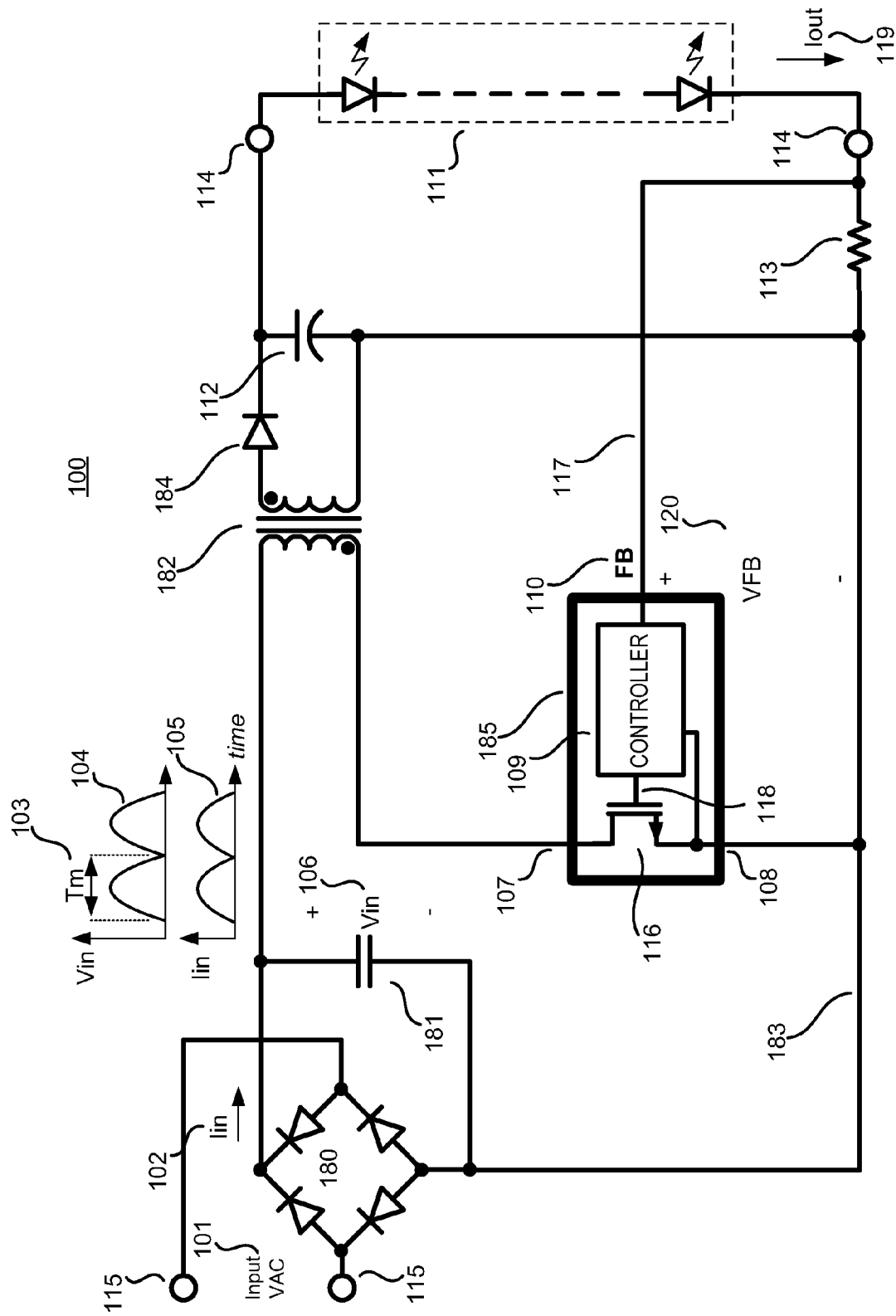
FIG. 1 illustrates an example schematic of a switch mode power converter including an example controller in accordance with the teachings of the present invention.

In one aspect of the present invention, methods and apparatuses disclosed here for explanation purposes use a power converter to provide power factor correction of an input current waveform. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples.

As will be discussed below, various examples in accordance with the teachings of the present invention allow a power factor corrected power converter controller to use a control technique that reduces the size, cost and number of external circuit components required to provide a compact power factor corrected power converter by providing a novel technique to dramatically slow the loop response of the power converter controller without the need for traditional external filtering techniques. In this way an elegant, compact LED lamp converter can be manufactured with the controller providing slow loop response with no additional external components.

In one example the controller is coupled to drive a switch that is switched on and off by the controller in a way to regulate the flow of energy from an input to an output of the power converter as will be described in more detail below. In one example the controller samples feedback information representative of the output of the power converter at a feedback sampling frequency. In one example, the feedback information representative of the output of the power converter is representative of a current flowing in an LED load coupled to the output of the power converter. In another example, the feedback information may be representative of a voltage at the output of the power converter. In one example, the feedback sampling frequency is substantially equal to a switching frequency of the power switch. This feedback sampling frequency is relatively high, meaning that, for example, more than 300 such samples are taken during the period of one cycle of the ac mains. This period of the ac mains is typically 16 to 20 milliseconds (corresponding to 50 to 60 Hertz ac mains frequency) depending on where in the world the circuit is operating.

In one example, the controller gathers feedback information in this way for a feedback time period, which in examples could be the period of half or a whole ac mains cycle. In one example the controller sets a substantially fixed operating condition of a power switch to be controlled by the controller for the duration of the feedback time period. As will be discussed in greater detail below, a fixed operating condition in this context could mean a substantially fixed switch on time, a substantially fixed switching frequency, or the like, of the switching of the power switch controlled by the controller to control the transfer of energy from an input of a power converter to an output of the power converter.

In one example, the operating condition of the power switch is maintained for the entire feedback time period and the next operating condition not set until the end of each feedback time period based on the feedback information gathered at the feedback sampling frequency during that feedback time period. The feedback information is gathered by counting the number of feedback samples above or below a first feedback threshold level during the feedback time period. In one example, the controller is configured to respond during the feedback time period if the feedback information representative of the output of the power converter exceeds a threshold level, which could indicate an abnormal condition that requires much more rapid response to provide protection to the power converter or load for example.

To illustrate, FIG. 1 shows generally a schematic of an example controller 109 included in a power supply, shown as power converter 100, in accordance with the teachings of the present invention. In the example, power converter 100 is a flyback converter that is coupled to a source of ac voltage 101 at the input of the power converter 100. Typically, an ac voltage source is provided by an electrical distribution system (e.g., power plant) through an electrical socket. As shown in the example, a bridge rectifier 180 converts ac line voltage to a substantially unsmoothed dc input voltage waveform 104 of magnitude $V_{IN}$ 106. In the illustrated example, capacitor 181 is of very low value and is for the purpose of filtering high frequency noise currents and offers substantially no smoothing of the rectified voltage waveform 104.

As illustrated in the example of FIG. 1, power converter 100 is shown including an energy transfer element, shown as a transformer 182, that is coupled to a bridge rectifier 180 at one end and a power switch 116 at an opposite end. In operation, power switch 116 is in an 'on' or 'closed' state when power switch 116 is able to conduct current and in an 'off' or 'open' state when power switch 116 in unable to conduct current. In the example, an input return 183 is coupled to power switch 116. In operation, current flows through energy transfer element 182 when power switch 116 is on and current flows through energy transfer element 182 and output diode 184 for at least a portion of the time for which power switch 116 is off. In the illustrated example, therefore, the energy transfer element 182 transfers energy to an output of the power converter 100 in response to the switching of power switch 116 in accordance with the teachings of the present invention. In the example, therefore, power converter 100 is coupled to transfer energy from the input terminals 115 to the load 111 coupled to output terminals 114. In the example, controller 109 drives power switch 116 on and off through coupling 118. In the example, power switch 116 and controller 109 form part of integrated circuit 185, which could be manufactured as a monolithic (single die) or hybrid (multiple die) integrated circuit. In other examples, the controller and power switch could be housed in completely separate packages whilst still benefiting from the teachings of the present invention.

As shown in the example, feedback signal 120 is coupled to controller 109 through connection 117. In the example, the feedback signal 120 is generated across sense resistor 113, which provides a voltage VFB proportional to the current 119 flowing through load 111. In other examples, other current sense circuits such as current sense transformers and the like could be used whilst still benefiting from the teachings of the present invention. In yet other examples, the power converter could be an isolated supply, in which case an opto-coupler, a feedback winding, a primary winding, or other way of isolating a signal representative of the load current 119 and feedback signal 120 would be employed whilst still benefiting from the teachings of the present invention.

In one example, controller 109 controls the switching of power switch 116 to regulate a flow of energy from input terminals 115 to output terminals 114 to provide an input current 102 having a waveform 105 that is substantially in phase with and proportional to voltage waveform 104. In one example, controller 109 gathers feedback information from feedback signal 120 at a feedback sampling frequency generated internal to the controller 109. In one example, controller 109 gathers feedback information from feedback signal 120 for a feedback time period, which is substantially greater than a period of a feedback sampling signal used to sample the feedback signal. For instance, in one example, the feedback time period is half of the ac mains period 103. In other examples, the feedback time period could be substantially equal to a complete ac main cycle or another period of even longer duration. In one example, the controller 109 sets the operating condition of the switch controlled by the controller at the end of the feedback time period in response to the feedback information gathered during the feedback time period.

In one example the feedback signal 120 is sampled substantially 320 times for each feedback time period. In other words, in one example, the period of the feedback time period signal is at least 320 times longer than the period of the feedback sampling signal, which is equal to a reciprocal of the feedback sampling frequency. In another example, the period of the feedback time period signal is at least 500 times longer than an average of the switching cycle periods during a feedback time period. It is appreciated that although the feedback signal 120 is shown as a voltage signal, in other examples a feedback current signal could be used whilst still benefiting from the teachings of the present invention.

Figure 2A:
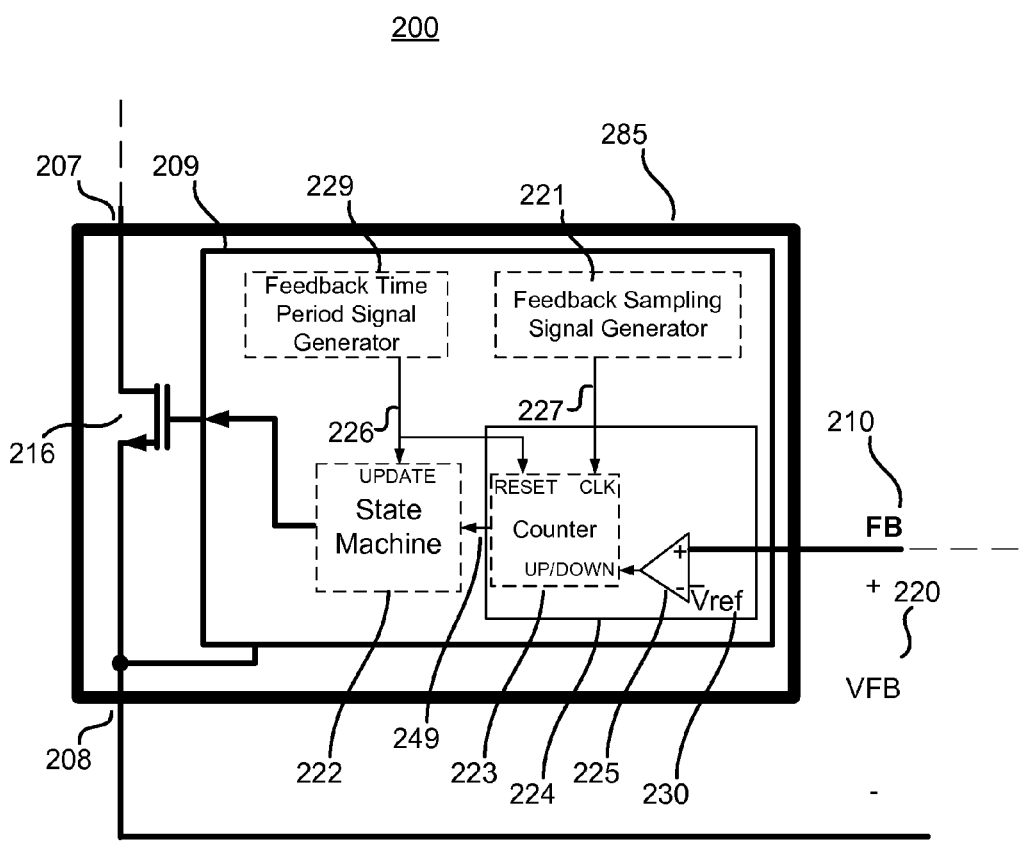
FIG. 2A is a functional block diagram illustrating an example controller in accordance with the teachings of the present invention.

FIG. 2A shows an example block diagram of an integrated circuit 285 comprising controller 209 and switch 216 benefiting from the teachings of the present invention. In the example, controller 209 comprises a feedback sensor circuit 224, a state machine 222, a feedback time period signal generator 229 and a feedback sampling signal generator 221 coupled together as shown. In the example, feedback terminal 210 receives a feedback signal 220 that is a voltage relative to ground terminal 208 of integrated circuit 285. The feedback signal 220 is compared to a threshold level Vref 230 at the input to comparator 225. In the example, comparator 224 is a threshold level sensing circuit having a threshold level equal to the threshold level Vref 230. The output of comparator 225 is coupled to counter 223, which is clocked by feedback sampling signal 221. In the example, the output of counter 223 is coupled to state machine 222. In one example, state machine 222 sets the operating condition or state with which controller 209 will control the switching of switch 216 based on the value of the counter 223 at the time when it is updated by feedback time period signal 226, which is generated by feedback time period signal generator 229. In one example, feedback sampling signal 227 has a period at least 320 times shorter than the period of feedback time period signal 226. In other words, feedback sampling signal 227 clocks counter 223 at least 320 times more often than feedback time period signal 226 updates state machine 222 in the example.

In one example, an operating condition or state set by state machine 222 includes a fixed on time per switching cycle of switch 216 and/or a fixed switching frequency for the switching of switch 216 at least until the next feedback time period signal 226 is received by state machine 222. In other words, the switch 216 switching frequency and/or the on time per switching cycle of switch 216 is unresponsive to the feedback signal 220 until at least such time that the feedback time period signal 226 is received. After the next feedback time period signal 226 is received by state machine 222, depending on the value of the counter 223, the state machine 222 then may then set the operating condition state to remain the same or the state machine 222 may set another operating condition state to control the switching of the switch 216.

Figure 2B:
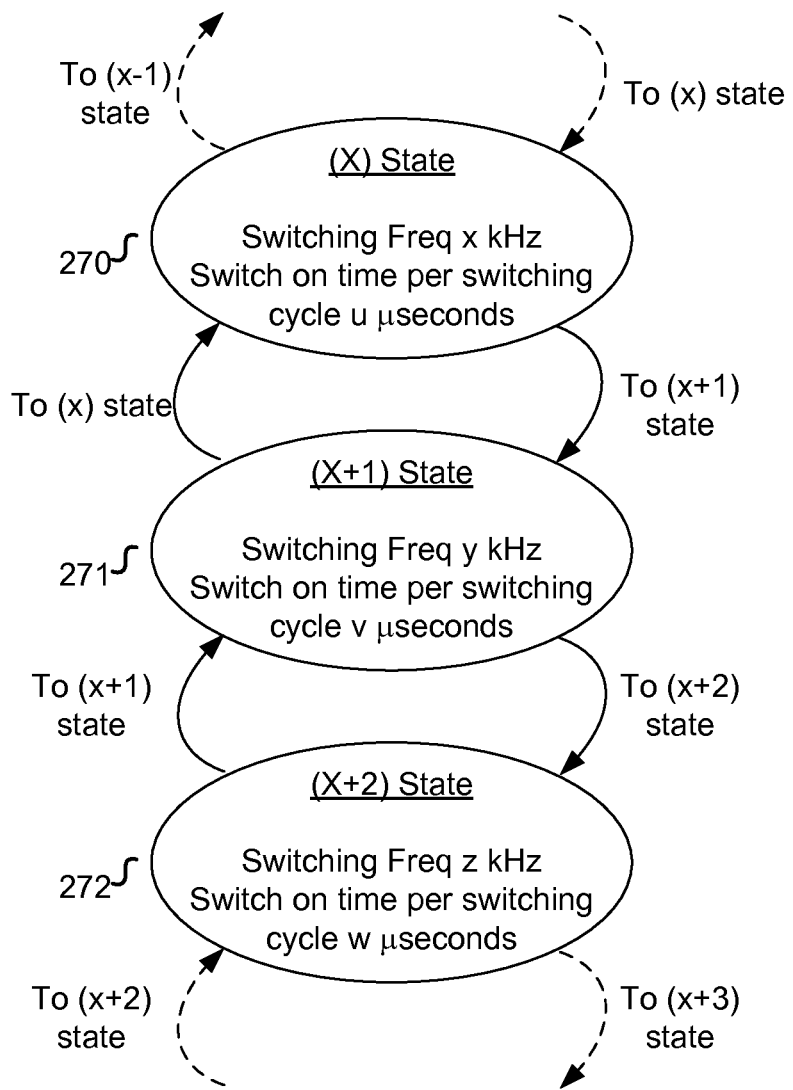
FIG. 2B illustrates a portion of a state machine state diagram for an example controller in accordance with the teachings of the present invention.

To illustrate, FIG. 2B shows one example of a portion of a state machine, which in one example could be state machine 222 of FIG. 2A. In the example illustrated in FIG. 2B, three operating condition states 270, 271 and 272 are shown with fixed switching frequency and fixed switch on times. In another example, the switching frequency can be jittered to reduce electromagnetic interference (EMI). In one example, the full state machine state diagram could consist of 256 states. In other examples, the full state machine state diagram could consist of a greater or fewer number of states than 256 states, depending on the granularity desired for the state machine with respect to the particular design. In the example illustrated in FIG. 2B, in operating condition state (X) 270, the switching frequency is fixed at x kHz and the switch on time for every switching cycle is fixed at u μseconds.

With reference to FIG. 2A, the value of the counter 223 could indicate to state machine 222 that the next operating condition state is to change from operating condition state (X) 270 to operating condition state (X+1) 271 in FIG. 2B. Operating condition state (X+1) 271 has a switching freq of y kHz, which is higher, and a switch on time of v μseconds, which is greater than the respective variables in operating condition state (X) 270. In the same way, in the example, operating condition state (X+2) 272 also has a switching freq that is higher and a switch on time that is greater than those variables in operating condition state (X+1) 271. In one example, the change in switching frequency and switch on time per switching cycle could be selected such that the percentage change in power delivery by transitioning between operating condition states is substantially constant. In one example, having the percentage change in power delivery between states substantially fixed helps to ensure that a power converter gain is substantially fixed, independent of the particular states between which there is a transition. The way in which the transitions between operating condition states are determined is described in more detail below with reference to FIG. 3.

Figure 3:
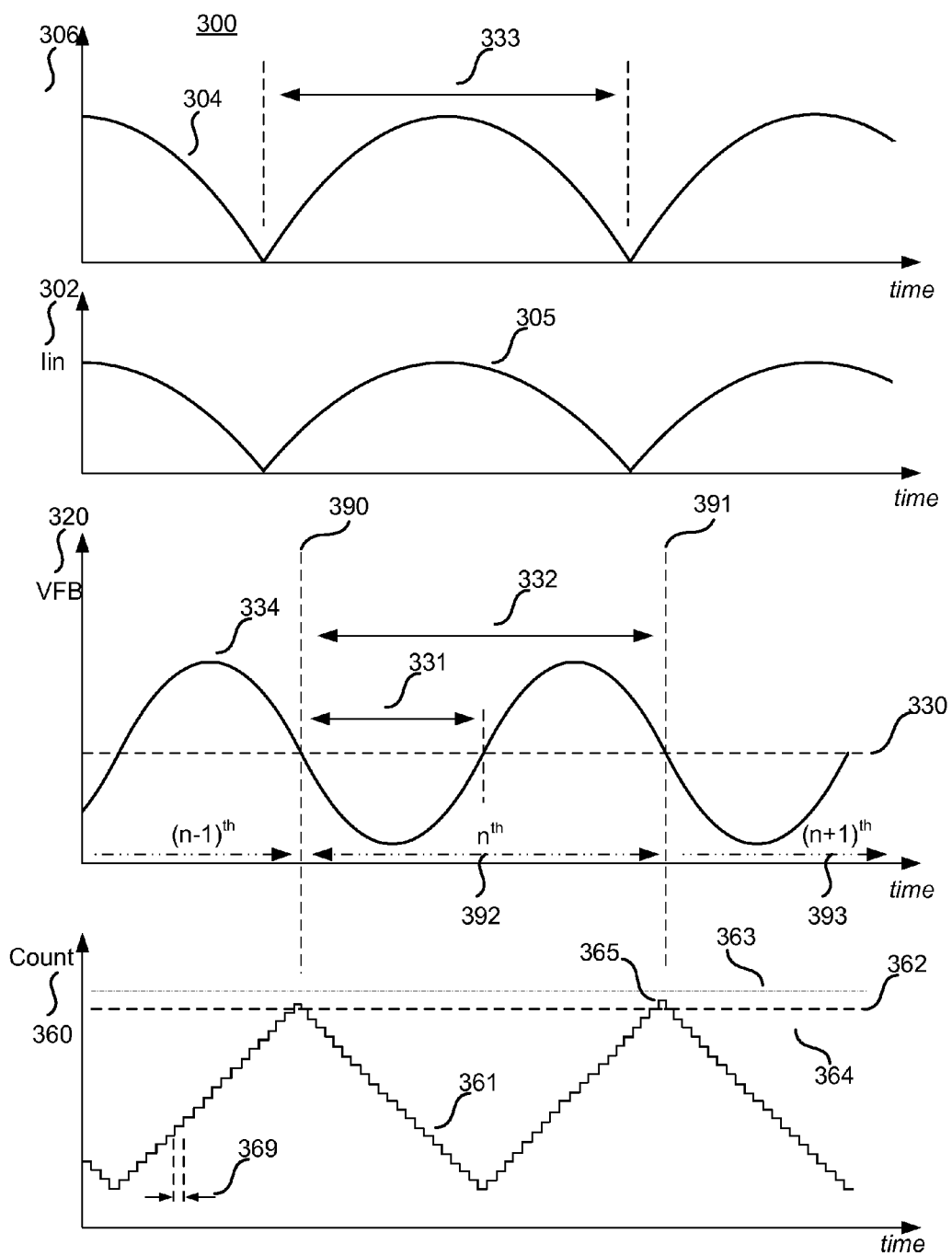
FIG. 3 shows waveforms to illustrate the operation of an example power converter employing an example controller in accordance with the teachings of the present invention.

FIG. 3 shows example waveforms that illustrate the operation of a controller benefiting from the teachings of the present invention, which in one example could be similar to controllers 109 and 209 in FIGS. 1 and 2A, respectively. In the example, waveform 304 is a full-wave rectified unsmoothed voltage waveform, which in one example corresponds to the waveform 104 in FIG. 1. In the example, waveform 305 is an input current waveform, which in one example corresponds to the waveform 105 in FIG. 1. In the example, waveform 334 is a feedback signal waveform, which in one example corresponds to feedback waveforms 120 and 220 in FIGS. 1 and 2A, respectively, and is therefore representative of the current flowing in the load.

It is noted that in the example of FIG. 3, output current waveform or feedback waveform 334 is not in phase with the input current waveform 305, which in one example could be due to the effects of an output capacitor coupled across the output of the power converter, such as for example capacitor 112 in FIG. 1, which will tend to phase shift the output current waveform relative to the input current waveform. In one example, capacitor 112 of FIG. 1 helps to avoid excessive peak currents in the load as will be discussed in more detail with respect to FIG. 5 below.

It will be noted that despite being phase shifted from waveform 305, waveform 334 also has an overall period 332 that is substantially identical to the cycle period 333 of the input voltage waveform 304. In one example, therefore, this allows a feedback time period signal, such as feedback time period signal 226 in FIG. 2A for example, to be generated using any of waveforms 304, 305 or 334. If waveform 334 is used, the event of feedback signal waveform 334 transitioning from being greater than a feedback threshold value 330 to being less than the feedback threshold value 330 can be used as the event to generate the feedback time period signal 226. For example, time points 390 and 391 in FIG. 3 could be the start and end points of consecutive feedback time periods, with time point 390 indicating the start point of an $n^{th}$ feedback time period and time point 391 indicating the end of the $n^{th}$ feedback time period 392 and the start of the next feedback time period, which is shown as an $(n+1)^{th}$ feedback time period 393. In other words, each of the periods of the feedback time period signal is in one example substantially equal to a time period between every second time the feedback signal 334 crosses the threshold level 330. In another example, the period of the feedback time period signal could instead be substantially equal to time period 333, which is equal to one half cycle of the ac mains voltage waveform 304. In other words, in one example the period of the feedback time period signal is substantially equal to a time period between every zero voltage condition of a source of ac voltage coupled to the input of the power converter.

In one example, waveform 361 represents a counter output that is incremented or decremented at a rate of the feedback sampling signal period 369. In the example, if the feedback signal 334 is greater than feedback threshold level 330, the counter waveform 361 is incremented every feedback sampling period 369. Conversely, in the example, if the feedback signal 334 is less than feedback threshold level 330, the counter waveform 361 is decremented every feedback sampling signal period 369. In one example, the value of counter waveform 361 could be similar to the output of counter 223 in FIG. 2A. In the example of FIG. 3, the final value of the count represented by waveform 361 at time point 391, which is the end of $n^{th}$ feedback time period 392 in FIG. 3, is value 365. In one example, there is a hysteresis band defined by count thresholds 363 and 364 as shown in FIG. 3.

With reference to the controller 209 in FIG. 2A, for example, if the output of the counter, shown as counter signal 249, has a value in between threshold count values 363 and 364, the state machine 222 sets an operating condition state for the next $(n+1)^{th}$ feedback time period that is unchanged from the operating condition state previously used for the $n^{th}$ feedback time period. In other words, in one example, for the next operating condition state for the $(n+1)^{th}$ feedback time period to be a different operating condition state, the final value of the count at time point 391 would have to be either greater than threshold level 363 or lower than threshold level 364.

It is appreciated that in other examples, multiple count thresholds greater than threshold 363 and less than threshold level 364 could be employed. In one example, these multiple count thresholds could be used to introduce a dynamic response determined in response to the value of the counter count 360 to determine the necessary change in the state machine 222 operating condition state at the end of a feedback time period. For example, if the final value of the counter count 360 at time point 391 was significantly higher the threshold 363, this could indicate a significant reduction in a power supply loading, which could in one example require a significantly lower state machine state. By having multiple count thresholds above threshold 362, therefore, it would be possible in one example to select a state machine 222 operating condition state appropriate to the magnitude of the counter count 360.

This operation can be further illustrated with reference to FIG. 2B above. In an example where the controller is operating in operating condition state (X) 270 during $n^{th}$ feedback time period 392, it will remain in operating condition state (X) 270 for the next $(n+1)^{th}$ feedback time period 393 in the example shown where final count value 365 is between hysteresis threshold count levels 363 and 364. In another example, however, if the final count value were less than threshold count level 364, then this would indicate that over the preceding feedback time period, the feedback signal, for example feedback signal 220, was below the feedback threshold level Vref 230, for example, more than it was above the feedback threshold level Vref 230 during that feedback time period. In this example, it would then be necessary to increase the power delivered to the load, for example load 111 in FIG. 1. In one example therefore, under such conditions, the state machine 222 would transition from operating condition state (X) 270 to operating condition state 271 (X+1).

As described with reference to FIG. 2A above, in other examples, multiple counter thresholds could be employed in addition to threshold count levels 363 and 364. In such examples, the state machine 222 could for example transition from state (X) 270 to state (X+2) if the count value at the end of a feedback time period indicated that a more significant increase in power delivery to the load, for example load 111 in FIG. 1, were necessary.

In the example of FIG. 3 the count value is always reset at the end of each feedback time period to the threshold count level 362. In the example of FIG. 2A, this reset of the counter 223 is represented by the application of feedback time period signal 226 to the RESET input of counter 223. This reset ensures that each feedback time period responds to the feedback information gathered during that feedback time period and therefore does not accumulate errors from one or more preceding feedback time periods that could lead to power converter instability.

Figure 4:
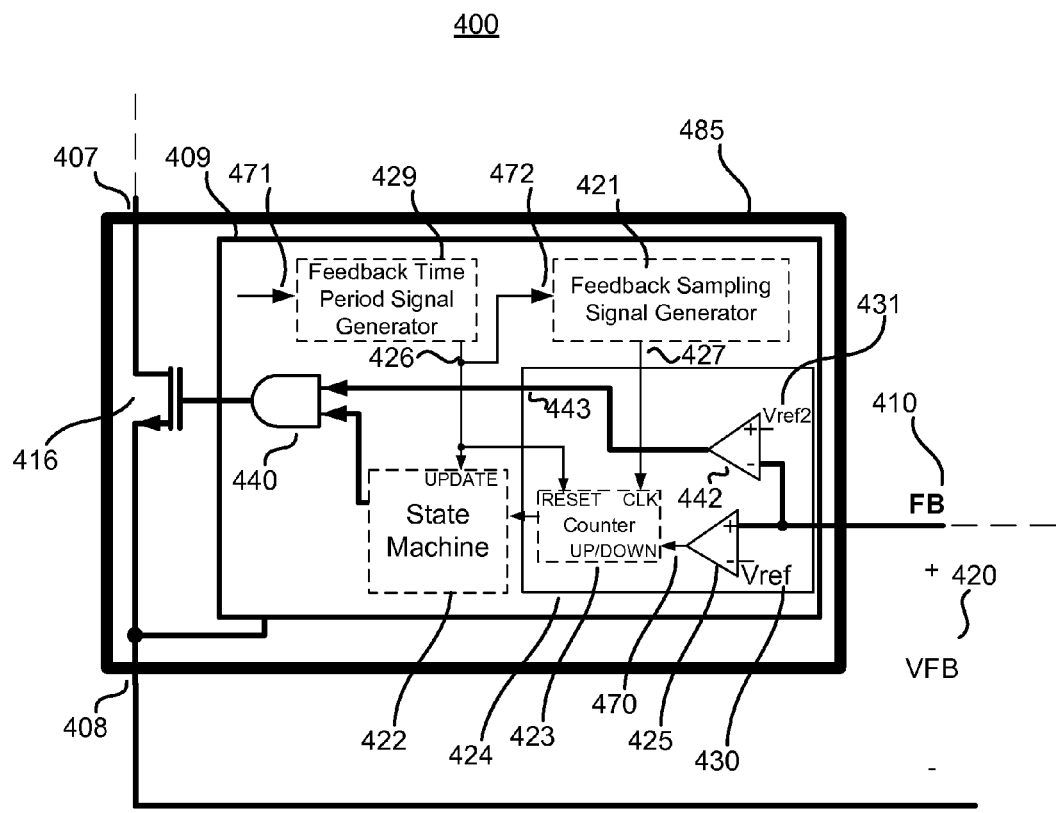
FIG. 4 is a functional block diagram illustrating an example controller in accordance with the teachings of the present invention.

FIG. 4 shows an example block diagram of an integrated circuit 485 comprising a controller 409 and a switch 416 benefiting from the teachings of the present invention. In one example, the operation of controller 409 shares many aspects with controller 209 in FIG. 2A. For instance, in the example, controller 409 comprises a feedback sensor circuit 424, a state machine 422, a feedback time period signal generator 429 and a feedback sampling signal generator 421 coupled together as shown. In the example, feedback terminal 410 receives a feedback signal 420 that is a voltage relative to ground terminal 408 of integrated circuit 485. The feedback signal 420 is compared to a threshold level Vref 430 at the input to comparator 425. The output of comparator 425 is coupled to counter 423, which is clocked by feedback sampling signal generator 421. In the example, the output of counter 423 is coupled to state machine 422. In one example, state machine 422 sets the operating condition or state with which controller 409 will control the switching of switch 416 based on the value of the counter 423 at the time when it is updated by feedback time period signal 426 that is generated by feedback time period signal generator 429. In one example, feedback sampling signal 427 has a period at least 320 times shorter than the period of feedback time period signal 426. In other words, feedback sampling signal 427 clocks counter 423 at least 320 times more often than feedback time period signal 426 updates state machine 422 in the example.

FIG. 4 also shows that feedback time period signal generator 429 includes an input 471, which in one example may be coupled to the input or output of the power converter to obtain timing information used to generate the feedback time period signal 426. In one example, the period of the feedback time period signal 426 is substantially equal to a time period between every zero voltage condition of a source of ac voltage coupled to an input of the power converter, such as for example time period 333 as illustrated in FIG. 3. In another example, feedback time period signal 426 is substantially equal to a time period between every other time where the feedback signal 334 crosses the feedback threshold 330, such as for example period 332 as illustrated in FIG. 3.

FIG. 4 also shows feedback sampling signal generator 421 coupled to receive an input 472, which in one example could be the feedback time period signal 426 from feedback time period signal generator 429. In one example, feedback time period signal 426 is used by feedback sampling signal generator 421 to adjust the period of feedback sampling signal 427 to ensure that a substantially fixed number of feedback sampling signals 427 are provided for every single feedback time period signal 426. In one example, this function is similar to a phase locked loop circuit that will be familiar to ones skilled in the art. In one example, the period of feedback sampling signal 427 is adjusted to ensure that 320 feedback sampling signals 427 are provided for every single feedback time period signal 426. In other examples, a greater or fewer number of feedback sampling signals 427 than 320 may be included in every feedback time period signal 426. The tradeoffs for having a greater number of feedback signals would be the benefit of having higher resolution and sensitivity in exchange for the increased cost and complexity of the circuitry to support the increased number of feedback sampling signals 427.

The example illustrated in FIG. 4 also shows a second threshold level sensing circuit, illustrated as second comparator 442, which is included within feedback sensor circuit 424, with one input coupled to receive feedback signal 420 and the other input coupled to receive a second feedback threshold Vref2 431, which in one example is greater than Vref 430. In the example, the output signal 443 from comparator 442 is coupled to enable/disable state machine 422 from switching switch 416 in response to a comparison of feedback signal 420 with Vref2 431. In one example, signal 443 transitions from high to low due to feedback signal 420 exceeding Vref2 431. In operation, logic 440, which is illustrated as an AND gate in FIG. 4, is coupled to receive signal 443 to enable/disable state machine 422 as shown. As shown in the example, logic 440 disables the switch 416 until such time that the feedback signal no longer exceeds Vref2 431. In one example, this operation provides protection for the power converter in which controller 409 is used and also protects the output load coupled to the power converter in which controller 409 is used as will be described below.

Figure 5:
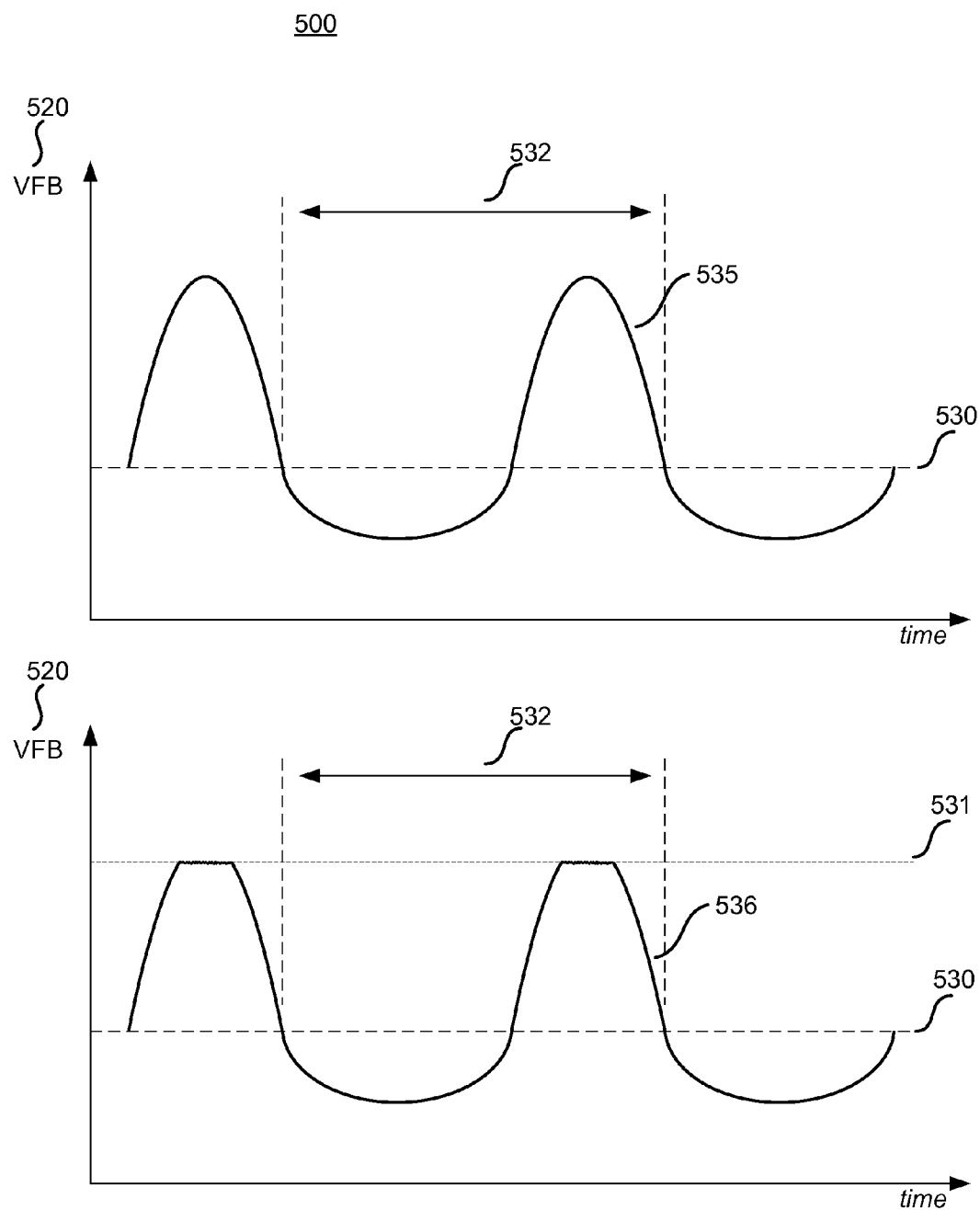
FIG. 5 shows waveforms to illustrate the operation of an example power converter employing an example controller in accordance with the teachings of the present invention.

FIG. 5 shows feedback waveforms that illustrate the effect of using a very small value output capacitor, such as for example capacitor 112 in FIG. 1, with and without the additional circuitry described above with reference to FIG. 4. As will be discussed, waveform 535 can result if comparator 442 and the associated circuitry described above, such as for example controller 209 in FIG. 2A, are not used. Waveform 536 illustrates an example of a feedback waveform with a controller benefiting from the improvements of FIG. 4

With regard to waveform 535, when compared to the more symmetrical feedback waveform 334 in FIG. 3, waveform 535 has much higher peak values corresponding to high peaks in load current during the feedback time period 532. In one example, such high peak currents can be damaging to both the load, such as for example the LED load 111 in FIG. 1, and also power converter output components, such as for example output diode 184 in FIG. 1. In one example a feedback waveform such as waveform 535 could reduce the lifetime of the power converter and load, which is typically not acceptable. However, it is often attractive to reduce the value of the output capacitor as much as possible for space and cost saving reasons. The introduction of the improvements described in the example of FIG. 4 above therefore allow the most positive peaks of the waveform 535 to be limited to a second threshold feedback level 531, which in one example could be similar to second feedback threshold level Vref2 431 in FIG. 4.

It is noted that because the example controller 409 in FIG. 4 will respond with substantially no delay to feedback signal values exceeding second threshold level 431, the power factor of the power converter will be degraded to some extent. However, since power factor targets for typical applications such as LED lighting are in the range of 0.7 to 0.9, some degradation in power factor is still acceptable and that the cost and space savings of using a small output capacitor can make this an attractive trade off.

In addition, it is noted that the capacitance value of output capacitors, such as for example capacitor 112 in FIG. 1, may decrease over time during the lifetime of a power converter. As such, in one example, the additional circuitry described in FIG. 4 can protect the load and power converter as the capacitance of the output capacitor decreases over time during the lifetime of the power converter.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter connected to an input, comprising:
 a comparator coupled to receive a feedback signal representative of an output of the power converter;
 a counter coupled to receive an output of the comparator and a feedback sampling signal, wherein the counter is coupled to sample the output of the comparator in response to the feedback sampling signal; and
 a state machine coupled to receive a feedback time period signal, wherein the state machine is coupled to control switching of the power converter according to one of a plurality of operating conditions in response to the counter and the feedback time period signal, wherein a period of the feedback time period signal is substantially greater than a period of the feedback sampling signal, wherein the state machine is coupled to be updated in response to the feedback time period signal.

2. The controller of claim 1 wherein a frequency of the feedback sampling signal is substantially equal to a switching frequency of the switch.

3. The controller of claim 1 wherein the switching of the power converter is coupled to control a transfer of energy from the input of the power converter to the output of the power converter.

4. The controller of claim 1 wherein the switching of the power converter is coupled to control a transfer of energy from the input of the power converter to the output of the power converter such that an input current flowing in the input of the power converter is substantially in phase with and proportional to an ac voltage at the input of the power converter.

5. The controller of claim 1 wherein the feedback signal representative of the output of the power converter is representative of a current flowing through the output of the power converter.

6. The controller of claim 1 wherein the counter is coupled to be reset at an end of each period of the feedback time period signal.

7. The controller of claim 1 wherein each of the plurality of operating condition states includes a substantially fixed switch on time.

8. The controller of claim 1 wherein each of the plurality of operating condition states includes a substantially fixed switching frequency and a substantially fixed switch on time.

9. The controller of claim 1 wherein the period of the feedback time period signal is at least 320 times longer than the period of the feedback sampling signal.

10. The controller of claim 1 wherein each period of the feedback time period signal is substantially equal to a time period between every zero voltage condition of a source of ac voltage coupled to the input of the power converter.

11. The controller of claim 1, wherein the comparator is coupled to compare the feedback signal with a first threshold level, wherein each of the periods of the feedback time period signal is substantially equal to a time period between every second time the feedback signal crosses the first threshold level.

12. The controller of claim 11 wherein the counter is coupled to be decremented by the comparator in response to an output of a comparison of the feedback signal with the first threshold level being in a second state.

13. The controller of claim 11 wherein the counter is coupled to be incremented by the comparator in response to an output of a comparison of the feedback signal with the first threshold level being in a first state.

14. The controller of claim 1 wherein the counter is coupled to be clocked in response to the feedback sampling signal at a feedback sampling frequency.

15. The controller of claim 1 wherein the state machine is coupled to set an operating condition state in response to an output value of the counter to control switching of the power converter.

16. The controller of claim 15 wherein the state machine is coupled to set a next operating condition state at an end of each period of the feedback time period signal in response to the output value of the counter.

17. The controller of claim 15 wherein the state machine is coupled to maintain an operating condition state until an end of each period of the feedback time period signal.

18. The controller of claim 1 further comprising a second comparator coupled to receive the feedback signal, wherein the second comparator compares the feedback signal to a second threshold level.

19. The controller of claim 18 further comprising logic coupled to the state machine to disable the state machine from switching of the power converter circuit in response to a comparison of the feedback signal with the second threshold level.

* * * * *